United States Patent

Martins et al.

(10) Patent No.: US 6,783,131 B2
(45) Date of Patent: Aug. 31, 2004

(54) NECK SEAL

(75) Inventors: Armando S. Martins, Cumberland, RI (US); Peter N. Osgood, Upton, MA (US); Earl S. Winslow, Grafton, MA (US)

(73) Assignee: Morgan Construction Company, Worcester, MA (US)

( * ) Notice: Subject to any disclaimer, the term of this patent is extended or adjusted under 35 U.S.C. 154(b) by 0 days.

(21) Appl. No.: 10/355,526

(22) Filed: Jan. 31, 2003

(65) Prior Publication Data

US 2004/0150167 A1 Aug. 5, 2004

(51) Int. Cl.⁷ .............................................. F16J 15/32
(52) U.S. Cl. ...................... 277/564; 277/566; 277/572; 277/565
(58) Field of Search ............................ 277/562, 564–6, 277/572

(56) References Cited

U.S. PATENT DOCUMENTS

| | | | | |
|---|---|---|---|---|
| 3,545,774 A | * | 12/1970 | Rickley | 277/564 |
| 4,099,731 A | * | 7/1978 | Salter, Jr. | 277/367 |
| 4,234,196 A | * | 11/1980 | Iida | 277/565 |
| 4,418,922 A | * | 12/1983 | Janzito | 277/565 |
| 4,421,329 A | * | 12/1983 | Jelinek | 277/560 |
| 4,586,720 A | * | 5/1986 | Simmons et al. | 277/565 |
| 5,316,392 A | * | 5/1994 | Innis, Jr. | 384/147 |
| 5,478,090 A | * | 12/1995 | Simmons et al. | 277/423 |
| 6,053,501 A | * | 4/2000 | Innis et al. | 277/571 |

* cited by examiner

Primary Examiner—Alison K. Pickard
(74) Attorney, Agent, or Firm—Gauthier & Connors

(57) ABSTRACT

A neck seal is disclosed for use in an oil film bearing assembly for a roll in a rolling mill, the roll having a neck with an intermediate tapered section leading to a reduced diameter end section contained within a sleeve, with the sleeve being fixed in relation to the roll neck and being journalled for rotation in a bushing fixed within a chock. The neck seal is adapted to be mounted on the tapered section of the roll neck for rotation therewith at a location surrounded by a seal end plate fixed to the chock. The neck seal comprises a flexible circular body having axially spaced radially outwardly projecting first and second flanges configured and dimensioned to sealingly contact the seal end plate. First and second axially spaced ridges projecting radially inwardly from the circular body for contact with the tapered section of the roll neck. The first and second ridges are respectively aligned substantially radially with and radially joined to the first and second flanges by solid intermediate portions of the seal body.

3 Claims, 1 Drawing Sheet

NECK SEAL

BACKGROUND OF THE INVENTION

1. Field of the Invention

This invention relates generally to rolling mill oil film bearings, and is concerned in particular with an improved neck seal employed to retain oil in and to exclude contaminants from such bearings.

2. Description of the Prior Art

With reference initially to FIG. 1, a known oil film bearing assembly is partially shown as comprising a roll 10 having an end face 12, and a tapered neck section 14 leading to a reduced diameter end section 16 surrounded by a sleeve 18. The sleeve is keyed or otherwise fixed to the roll neck for rotation therewith within a bushing 20 fixed in a chock 22.

A flexible neck seal 24 is received on the tapered neck section 14 for rotation therewith. The seal has a circular body with inboard and outboard lips 26, 28 in contact with the neck surface. The outboard lip 28 is reinforced by a spring, and is separated from the seal body by a gap 30. First and second axially spaced flanges 32, 34 project radially outwardly from the seal body, and a third flinger 36 projects angularly towards the chock 22.

The seal body is internally reinforced by an embedded steel cable 38 and coiled spring 40, and is externally constrained by a metal retaining band 42 located between the flanges 32, 34.

The flanges 32, 34 have oppositely directed lips arranged to frictionally contact the shoulders of a seal end plate 44, the latter being fixed to the chock 22 and cooperating therewith to define a sump 46. An inner seal ring 48 and a water guard 50 complete the seal assembly.

In operation, the roll 10, neck seal 24, inner seal ring 48 and sleeve 18 rotate together, while the bushing 20, chock 22, seal end plate 44 and water guard 50 remain stationary. Oil is supplied continuously between the sleeve 18 and bushing 20. The thus supplied oil is hydrodynamically formed into a film at the bearing load zone before emerging from between the sleeve and bushing for collection in the sump 46.

The lip seal 28, flinger 36 and outboard flange 34 serve to retain oil in the bearing, whereas the water guard 50, inner seal ring 48 and inboard flange 32 serve to exclude cooling water and entrained contaminants from penetrating into the bearing.

Proper seating and positioning of the neck seal 24 on the tapered roll neck section 14 is critical to the avoidance of leakage problems. However, because of the gap 30, the outboard portion of the seal body under the outboard flange 34 lacks radial support, with the main contact between the seal body and the roll neck being at 52 under the inboard flange 32. Thus, when the seal is mounted on the roll neck, friction at 54 between the end of the sleeve 20 and the unsupported portion of the seal body can cause the seal to seat in an offset position. The mispositioning is random, virtually impossible to detect, and can cause leakage.

The objective of the present invention is to eliminate or at least significantly minimize the above described problem by providing additional and strategically positioned radial support for the seal body, and by preferably coupling this additional support with a reduction in friction between the end of the sleeve and the seal body.

SUMMARY OF THE INVENTION

In accordance with the present invention, the seal body is provided with axially spaced support ridges projecting inwardly into the seal bore for contact with the roll neck. The support ridges are respectively aligned radially with solid portions of the seal body and with the seal flanges and the outer metal retaining band, thus providing support and position control for these critical components, while also minimizing frictional resistance to axial movement of the seal body into its seated position on the tapered section of the roll neck.

Advantageously, additional compliance ridges are added to the seal body at its interface with the end of the sleeve. The compliance ridges are deformable to ease radial positioning of the seal body.

These and other features and advantages of the present invention will now be described in greater detail with continued reference to the accompanying drawings, wherein:

DETAILED DESCRIPTION OF PREFERRED EMBODIMENT

Figure 1:
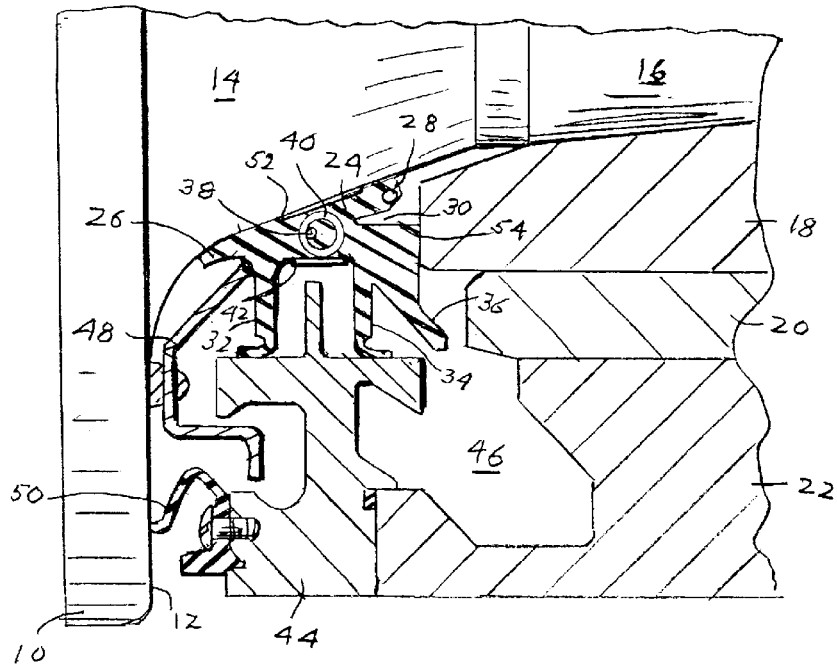
FIG. 1 is a partial cross sectional view through a seal assembly embodying a neck seal of conventional design.
Figure 2:
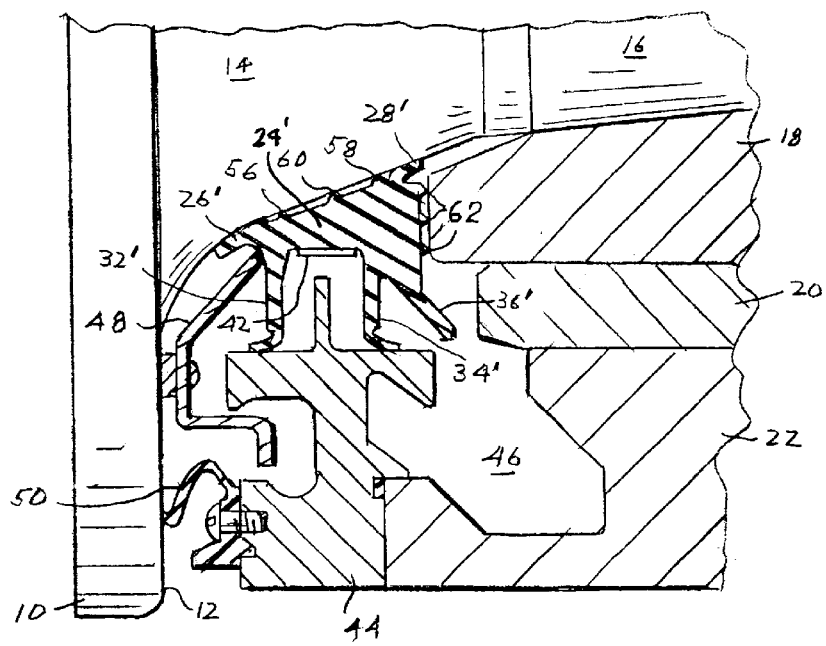
FIG. 2 is a view similar to FIG. 1 showing a seal assembly incorporating a neck seal in accordance with the present invention.

With reference to FIG. 2, where components other than the neck seal are identical to those illustrated in FIG. 1 and thus have been identified by the same reference numerals, it will be seen that the neck seal 24' of the present invention has a solid circular body with inboard and outboard lips 26', 28', inboard and outboard flanges 32', 34', a flinger 36' and an outer metal retaining band 42.

The seal body is additionally provided with axially spaced first and second ridges 56, 58 projecting radially inwardly for contact with the tapered neck section 14. The ridges 56, 58 are respectively aligned substantially radially with and are radially joined to the flanges 32', 34' by solid intermediate portions of the seal body.

Preferably, a third inwardly projecting ridge 60 is located between and spaced axially from both the first and second ridges 56, 58. Ridge 60 is aligned radially with the outer metal retaining band 42 and is separated therefrom by a solid intermediate portion of the seal body.

The ridges 56, 58, 60 provide radial support for and precise positioning of the flanges 32', 36' and the metal retaining band 42, while also beneficially reducing frictional resistance to axial seating of the neck seal on the roll neck. The ridges 56, 58 and 60 are also compliant and thus serve to compensate for manufacturing tolerances.

Fourth compliance ridges 62 are preferably provided on the outboard side of the seal body for contact with the end of the sleeve 20. The ridges 62 are deformable to accommodate radial shifting of the seal body with respect to the sleeve, thus avoiding frictionally induced distortion of the seal body as it is pushed into its seated position.

What is claimed is:

1. A neck seal for use in an oil film bearing assembly for a roll in a rolling mill, the roll having a neck with an intermediate tapered section leading to a reduced diameter end section contained within a sleeve, with the sleeve being fixed in relation to the roll neck and being journalled for rotation in a bushing fixed within a chock, said neck seal being adapted to be mounted on the tapered section of the roll neck for rotation therewith at a location surrounded by a seal end plate fixed to the chock, said neck seal comprising:

- a flexible circular body having axially spaced radially outwardly projecting first and second flanges configured and dimensioned to sealingly contact the seal end plate;
- a metal retaining band encircling the exterior of said body between said first and second flanges;
- first and second axially spaced ridges projecting radially inwardly from said body for contact with the tapered section of the roll neck, said first and second ridges being respectively aligned substantially radially with and radially joined to said first and second flanges by solid intermediate portions of said body; and
- a third ridge protecting radially inwardly from said body for contact with the tapered section of the roll neck, said third ridge being located between and spaced axially from both said first and second ridges, and being radially aligned with and radially spaced from said retaining band by a solid intermediate portion of said body.

2. The neck seal as claimed in claim 1 further comprising an end face on said body, said end face having radially spaced fourth ridges projecting axially from said body for contact with said sleeve.

3. A neck seal for use on the tapered neck section of a roll in a rolling mill, said neck seal comprising:

- a circular body having a tapered bore configured and dimensioned to accommodate axial mounting of said neck seal on said tapered neck section;
- axially spaced first and second flanges projecting radially outwardly from said body;
- a metal retaining band encircling the exterior of said body between said first and second flanges;
- axially spaced first and second ridges projecting radially inwardly from said body into said bore for contact with said tapered neck section, said first and second ridges being respectively aligned substantially radially with and integrally joined to said first and second flanges by solid intermediate portions of said body; and
- a third ridge projecting radially inwardly from said body into said base for contact with said tapered neck section, said third ridge being located between and axially spaced from both said first and second ridges, and being aligned with and radially spaced from said retaining band by a solid intermediate portion of said body.

* * * * *